US011561612B1

(12) United States Patent
Trent (10) Patent No.: US 11,561,612 B1
(45) Date of Patent: Jan. 24, 2023

(54) AR/VR NAVIGATION WITH AUTHENTICATION USING AN INTEGRATED SCROLLWHEEL AND FINGERPRINT SENSOR USER INPUT APPARATUS

(71) Applicant: Synaptics Incorporated, San Jose, CA (US)

(72) Inventor: Raymond A. Trent, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 17/398,201

(22) Filed: Aug. 10, 2021

(51) Int. Cl.
| | |
|---|---|
| *G06F 3/01* | (2006.01) |
| *G06F 21/32* | (2013.01) |
| *G02B 27/01* | (2006.01) |
| *G06F 3/03* | (2006.01) |
| *G06F 3/0482* | (2013.01) |
| *G06V 40/12* | (2022.01) |

(52) U.S. Cl.
CPC .......... *G06F 3/011* (2013.01); *G02B 27/0176* (2013.01); *G06F 3/0312* (2013.01); *G06F 3/0482* (2013.01); *G06F 21/32* (2013.01); *G06V 40/1365* (2022.01)

(58) Field of Classification Search
CPC .......... G02B 27/017; G02B 2027/0178; G02B 27/0176; G02B 27/0172; G06T 19/006; G06F 3/012
See application file for complete search history.

(56) References Cited

U.S. PATENT DOCUMENTS

| | | | | |
|---|---|---|---|---|
| 2003/0179184 A1* | 9/2003 | Bromba | .............. | G06F 3/03543 345/163 |
| 2004/0055446 A1* | 3/2004 | Robbin | .............. | G06F 16/4393 84/615 |
| 2004/0242269 A1* | 12/2004 | Fadell | ................... | G06F 3/0238 455/556.1 |
| 2004/0252109 A1* | 12/2004 | Trent, Jr. | ............ | G06F 3/03547 345/174 |
| 2007/0242057 A1* | 10/2007 | Zadesky | ............. | G06F 3/03547 345/173 |
| 2013/0285884 A1* | 10/2013 | Yamamoto | ............ | G06F 3/0481 345/8 |

(Continued)

*Primary Examiner* — Koosha Sharifi-Tafreshi
(74) *Attorney, Agent, or Firm* — Leydig, Voit & Mayer, Ltd.

(57) ABSTRACT

A virtual reality (VR) or augmented reality (AR) system includes: a display configured to display a user interface to a user; an integrated scrollwheel and fingerprint sensor (FPS) user input apparatus, comprising a scrollwheel configured to detect a rotational navigation input from the user and an FPS configured to detect a biometric input from the user; and a processing system configured to: receive the rotational navigation input via the scrollwheel of the integrated scrollwheel and FPS user input apparatus; update a displayed user interface on the display based on the received rotational navigation input, wherein updating the displayed user interface comprises updating a user selection on a displayed menu; receive an activation input for the updated user selection on the displayed menu via the FPS of the integrated scrollwheel and FPS user input apparatus; and execute an operation corresponding to the updated user selection on the displayed menu.

15 Claims, 9 Drawing Sheets

(56) References Cited

U.S. PATENT DOCUMENTS

| | | | |
|---|---|---|---|
| 2013/0321065 A1* | 12/2013 | Salter | H03K 17/9622 327/517 |
| 2015/0135108 A1* | 5/2015 | Pope | G06F 3/04897 715/767 |
| 2019/0206199 A1* | 7/2019 | Nakano | G06F 3/011 |

* cited by examiner

AR/VR NAVIGATION WITH AUTHENTICATION USING AN INTEGRATED SCROLLWHEEL AND FINGERPRINT SENSOR USER INPUT APPARATUS

BACKGROUND

Input devices, including touch sensors and fingerprint sensors, are widely used in a variety of electronic systems. Touch sensors and fingerprint sensors may include a sensing region, often demarked by a surface, in which the sensor determines the presence, location, motion, and/or features of one or more input objects. Touch sensors and fingerprint sensors may be used to provide interfaces for the electronic system. For example, touch sensors and fingerprint sensors may be used as input devices for larger computing systems (e.g., opaque touchpads and fingerprint sensors integrated in, or peripheral to, notebook or desktop computers). Touch sensors and fingerprint sensors are also often used in smaller computing systems (e.g., touch screens and fingerprint sensors integrated in smartphones).

In recent years, augmented reality (AR) and virtual reality (VR) systems are becoming increasingly popular, and there may be use cases for touch sensors and fingerprint sensors in AR and VR systems. However, conventional touch sensor and fingerprint sensor devices are often unsuitable for AR and VR environments, particularly where a user may not be able to conveniently look at or see the user input device that the user is interacting with.

SUMMARY

In an exemplary embodiment, the present disclosure provides a virtual reality (VR) or augmented reality (AR) system. The system includes: a display configured to display a user interface to a user of the VR or AR system; an integrated scrollwheel and fingerprint sensor (FPS) user input apparatus, comprising a scrollwheel configured to detect a rotational navigation input from the user and an FPS configured to detect a biometric input from the user; and a processing system configured to: receive the rotational navigation input via the scrollwheel of the integrated scrollwheel and FPS user input apparatus; update a displayed user interface on the display based on the received rotational navigation input, wherein updating the displayed user interface comprises updating a user selection on a displayed menu; receive an activation input for the updated user selection on the displayed menu via the FPS of the integrated scrollwheel and FPS user input apparatus; and execute an operation corresponding to the updated user selection on the displayed menu.

In a further exemplary embodiment, the processing system is further configured to: receive the biometric input from the FPS of the integrated scrollwheel and FPS user input apparatus; perform authentication based on the received biometric input; and execute the operation corresponding to the updated user selection on the displayed menu in response to successful authentication.

In a further exemplary embodiment, performing authentication based on the received biometric input comprises determining whether the received biometric input matches a stored template of a pre-enrolled authorized user.

In a further exemplary embodiment, the processing system is further configured to: receive another activation input for another user selection on the displayed menu via the FPS of the integrated scrollwheel and FPS user input apparatus; and execute another operation corresponding to the another user selection on the displayed menu in response to the another activation input without performing authorization for the another operation.

In a further exemplary embodiment, the integrated scrollwheel and FPS user input apparatus and the display are both physically integrated into a same housing.

In a further exemplary embodiment, the integrated scrollwheel and FPS user input apparatus and the display are both physically integrated into a housing of a VR or AR headset.

In a further exemplary embodiment, the integrated scrollwheel and FPS user input apparatus and the display are physically integrated into separate housings of separate devices.

In another exemplary embodiment, the present disclosure provides a method for navigation. The method includes: displaying, by a display, a user interface to a user; receiving, by a processing system, via a scrollwheel of an integrated scrollwheel and fingerprint sensor (FPS) user input apparatus, a rotational navigation input; updating, on the display, the displayed user interface based on the received rotational navigation input, wherein updating the displayed user interface comprises updating a user selection on a displayed menu; receiving, by a processing system, an activation input for the updated user selection on the displayed menu; and executing, by a processing system, an operation corresponding to the updated user selection on the displayed menu.

In a further exemplary embodiment, the activation input is received via an FPS of the integrated scrollwheel and fingerprint sensor (FPS) user input apparatus.

In a further exemplary embodiment, the method further includes: receiving, via the FPS of the integrated scrollwheel and FPS user input apparatus, a biometric input; and performing, by the processing system, authentication based on the received biometric input; wherein executing the operation corresponding to the updated user selection on the displayed menu is in response to successful authentication.

In a further exemplary embodiment, performing authentication based on the received biometric input comprises determining whether the received biometric input matches a stored template of a pre-enrolled authorized user.

In a further exemplary embodiment, the method further includes: receiving, by the processing system, another activation input for another user selection on the displayed menu via the FPS of the integrated scrollwheel and FPS user input apparatus; and executing, by the processing system, another operation corresponding to the another user selection on the displayed menu in response to the another activation input without performing authorization for the another operation.

In a further exemplary embodiment, the integrated scrollwheel and FPS user input apparatus and the display are both physically integrated into a same housing.

In a further exemplary embodiment, the integrated scrollwheel and FPS user input apparatus and the display are both physically integrated into a housing of a VR or AR headset.

In a further exemplary embodiment, the integrated scrollwheel and FPS user input apparatus and the display are physically integrated into separate housings of separate devices.

In yet another exemplary embodiment, the present disclosure provides an integrated scrollwheel and fingerprint sensor (FPS) user input apparatus. The apparatus includes: a scrollwheel configured to detect a rotational navigation input from a user, wherein the rotational navigation input from the user corresponds to a clockwise or counterclockwise motion of a user's finger on the scrollwheel, and wherein the scrollwheel has an outer boundary and an inner boundary, wherein the inner boundary defines an area surrounded by the scrollwheel; and an FPS, proximate to the scrollwheel and disposed within the area surrounded by the scrollwheel, configured to detect a biometric input from the user.

In a further exemplary embodiment, the apparatus further includes: a tactile ridge disposed between the scrollwheel and the FPS.

In a further exemplary embodiment, the FPS is further configured to detect an activation input from the user.

In a further exemplary embodiment, detecting the activation input from the user is based on detecting the presence of the user's finger on the FPS or detecting a force applied on the FPS by the user's finger.

In a further exemplary embodiment, the FPS comprises an integrated button, and wherein detecting the activation input from the user is based on the integrated button being pressed.

DETAILED DESCRIPTION

The following detailed description is exemplary in nature and is not intended to limit the disclosure or the application and uses of the disclosure. Furthermore, there is no intention to be bound by any expressed or implied theory presented in the preceding background and brief description of the drawings, or the following detailed description.

Exemplary embodiments of the present disclosure provide for devices and methods for navigation with seamless authentication in an AR or VR environment using an integrated scrollwheel and fingerprint sensor (FPS) user input apparatus. In various embodiments, by positioning a scrollwheel around a fingerprint sensor, a user-friendly and intuitive manner of receiving various forms of user input to perform navigation with authentication is achieved, even in situations (such as AR and VR) where the user may not be able to look at or see the input device that the user is interacting with.

Figure 1A:
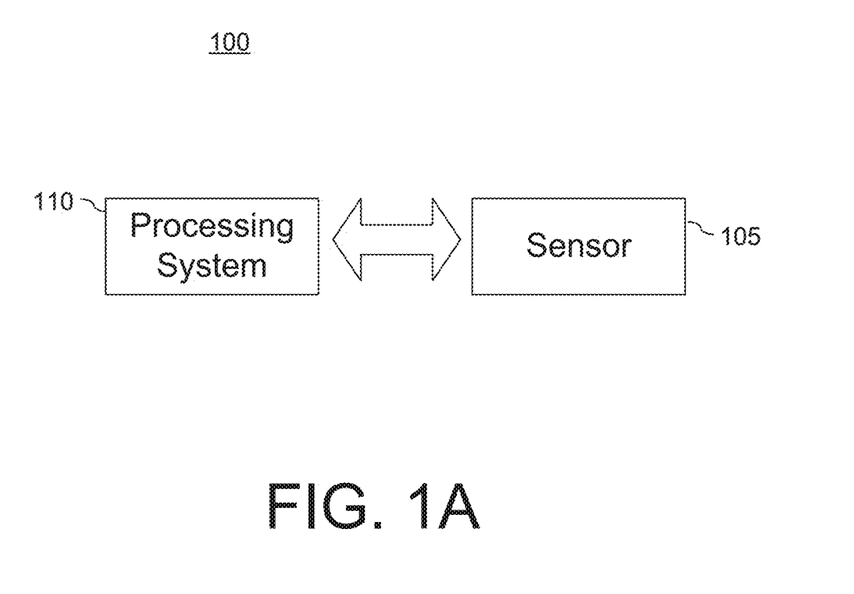
FIGS. 1A-1B are schematic block diagrams of exemplary input devices.
Figure 1B:
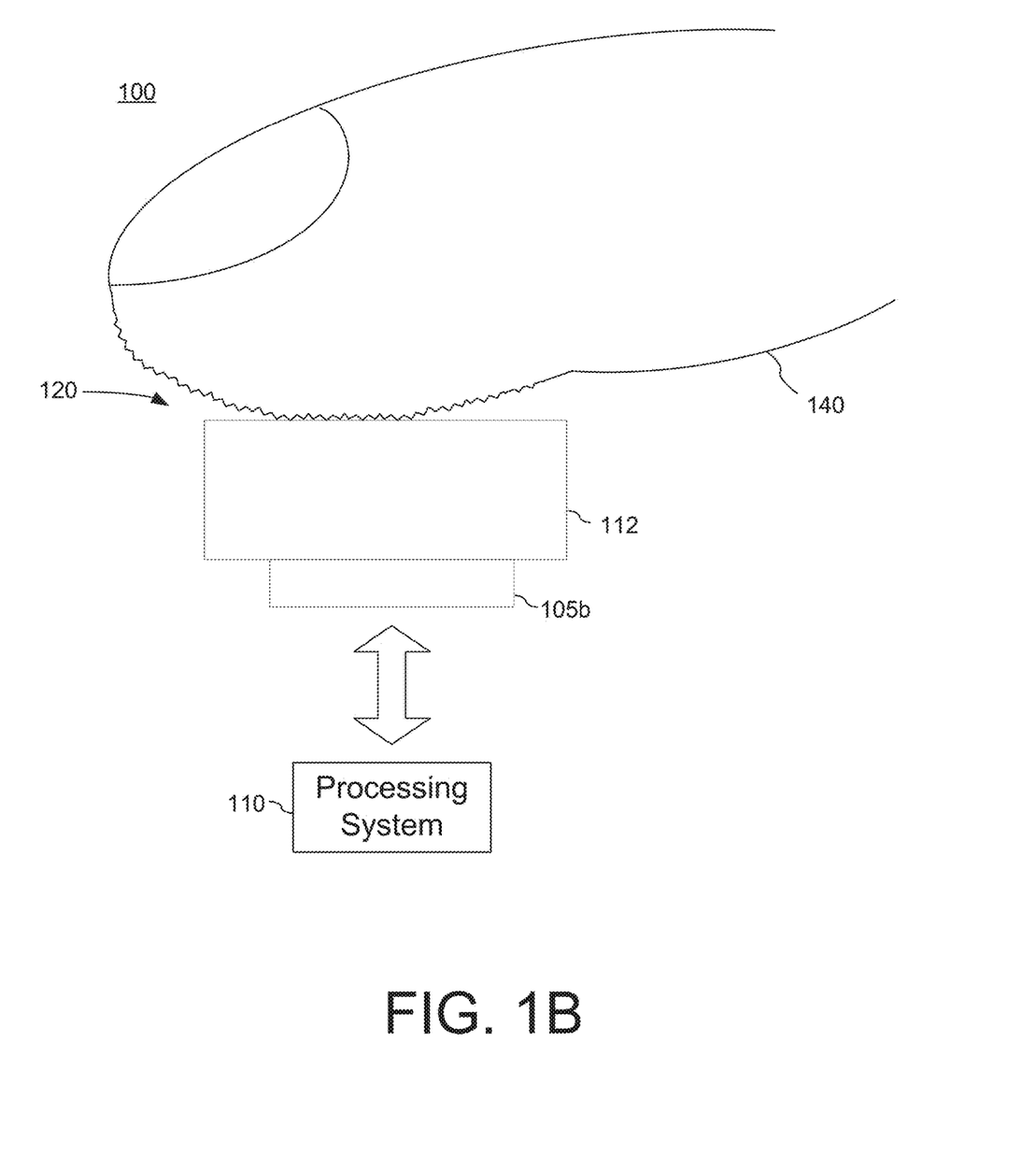

FIGS. 1A-1B illustrate example input devices for providing an exemplary description of how touch sensors and fingerprint sensors may be configured in accordance with exemplary embodiments of the present disclosure. It will be appreciated that FIGS. 1A-1B are provided by way of example, and that the types of touch sensors and fingerprint sensors usable in exemplary embodiments of the present disclosure are not limited to the examples discussed herein in connection with FIGS. 1A-1B.

FIG. 1A is a block diagram depicting an example input device 100 within which the present embodiments may be implemented. The input device 100 may be configured to provide input to an electronic system (not shown for simplicity). As used in this document, the term "electronic system" (or "electronic device") broadly refers to any system capable of electronically processing information. Examples of electronic systems include personal computing devices (e.g., desktop computers, laptop computers, netbook computers, tablets, web browsers, e-book readers, and personal digital assistants (PDAs)), wearable computers (e.g., smart watches and activity tracker devices), composite input devices (e.g., physical keyboards, joysticks, and key switches), data input devices (e.g., remote controls and mice), data output devices (e.g., display screens and printers), remote terminals, kiosks, video game machines (e.g., video game consoles, portable gaming devices, and the like), communication devices (e.g., cellular phones, such as smart phones), and media devices (e.g., recorders, editors, and players such as televisions, set-top boxes, music players, digital photo frames, and digital cameras). Additionally, the electronic system may be a host or a slave to the input device 100.

The input device 100 may be implemented as a physical part of the electronic system, or may be physically separate from the electronic system. The input device 100 may be coupled to (and communicate with) components of the electronic system using wired or wireless interconnections and communication technologies, such as buses and networks. Example technologies may include Inter-Integrated Circuit (I2C), Serial Peripheral Interface (SPI), Personal System/2 (PS/2), Universal Serial Bus (USB), Bluetooth®, Infrared Data Association (IRDA), and various radio frequency (RF) communication protocols defined by the IEEE 802.11 or other standards.

In the example of FIG. 1A, input device 100 includes a sensor 105. The sensor 105 comprises one or more sensing elements configured to sense input provided by one or more input objects in a sensing region of the input device 100. Examples of input objects include fingers, styli, and hands. The sensing region may encompass any space above, around, in, and/or proximate to the sensor 105 in which the input device 100 is able to detect user input (e.g., user input provided by one or more input objects). The sizes, shapes, and/or locations of particular sensing regions (e.g., relative to the electronic system) may vary depending on actual implementations. In some embodiments, the sensing region may extend from a surface of the input device 100 in one or more directions into space, for example, until a signal-to-noise ratio (SNR) of the sensors fall below a threshold suitable for accurate object detection. For example, the distance to which this sensing region extends in a particular direction may be on the order of less than a millimeter, millimeters, centimeters, or more, and may vary significantly with the type of sensing technology used and/or the accuracy desired. In some embodiments, the sensor 105 may detect input involving no physical contact with any surfaces of the input device 100, contact with an input surface (e.g., a touch surface and/or screen) of the input device 100, contact with an input surface of the input device 100 coupled with some amount of applied force or pressure, and/or a combination thereof. In various embodiments, input surfaces may be provided by surfaces of sensor substrates within which or on which sensor elements are positioned, or by face sheets or other cover layers positioned over sensor elements.

The input device 100 comprises one or more sensing elements for detecting user input. Some implementations utilize arrays or other regular or irregular patterns of sensing elements to detect the input object. The input device 100 may utilize different combinations of sensor components and sensing technologies to detect user input in the sensing region.

The input device 100 may utilize various sensing technologies to detect user input. Example sensing technologies may include capacitive, elastive, resistive, inductive, magnetic, acoustic, ultrasonic, and optical sensing technologies. In some embodiments, the input device 100 may utilize capacitive sensing technologies to detect user inputs. For example, the sensing region may include one or more capacitive sensing elements (e.g., sensor electrodes) to create an electric field. The input device 100 may detect inputs based on changes in capacitance of the sensor electrodes. For example, an object in contact with (or close proximity to) the electric field may cause changes in the voltage and/or current in the sensor electrodes. Such changes in voltage and/or current may be detected as "signals" indicative of user input.

The sensor elements may be arranged in arrays (regular or irregular patterns) or other configurations to detect inputs. In some implementations, separate sensing elements may be ohmically shorted together to form larger sensor electrodes. Some capacitive sensing implementations may utilize resistive sheets that provide a uniform resistance.

Example capacitive sensing technologies may be based on "self-capacitance" (also referred to as "absolute capacitance") and/or "mutual capacitance" (also referred to as "transcapacitance"). Transcapacitance sensing methods detect changes in the capacitive coupling between sensor electrodes. For example, an input object near the sensor electrodes may alter the electric field between the sensor electrodes, thus changing the measured capacitive coupling of the sensor electrodes. In some embodiments, the input device 100 may implement transcapacitance sensing by detecting the capacitive coupling between one or more transmitter sensor electrodes (also "transmitter electrodes" or "drive electrodes") and one or more receiver sensor electrodes (also "receiver electrodes" or "pickup electrodes"). For example, transmitter sensor electrodes may be modulated relative to a reference voltage to transmit transmitter signals while receiver sensor electrodes may be held at a relatively constant voltage to receive the transmitted signals. The reference voltage may be, for example, a substantially constant voltage or system ground. In some embodiments, transmitter sensor electrodes and receiver sensor electrodes may both be modulated. The signals received by the receiver sensor electrodes may be affected by environmental interference (e.g., from other electromagnetic signals and/or objects in contact with, or in close proximity to, the sensor electrodes). Sensor electrodes may be dedicated transmitters or receivers, or may be configured to both transmit and receive.

In some implementations, the input device 100 is configured to provide images that span one, two, three, or higher dimensional spaces. The input device 100 may have a sensor resolution that varies from embodiment to embodiment depending on factors such as the particular sensing technology involved and/or the scale of information of interest. In some embodiments, the sensor resolution is determined by the physical arrangement of an array of sensing elements, where smaller sensing elements and/or a smaller pitch can be used to define a higher sensor resolution.

The input device 100 may be implemented as a fingerprint sensor having a sensor resolution high enough to capture discriminative features of a fingerprint. In some implementations, the fingerprint sensor has a resolution sufficient to capture minutia (including ridge endings and bifurcations), orientation fields (sometimes referred to as "ridge flows"), and/or ridge skeletons. These are sometimes referred to as level 1 and level 2 features, and in an exemplary embodiment, a resolution of at least 250 pixels per inch (ppi) is capable of reliably capturing these features. In some implementations, the fingerprint sensor has a resolution sufficient to capture higher level features, such as sweat pores or edge contours (i.e., shapes of the edges of individual ridges). These are sometimes referred to as level 3 features, and in an exemplary embodiment, a resolution of at least 750 pixels per inch (ppi) is capable of reliably capturing these higher level features. In silicon fingerprint sensors, a resolution of around 500 ppi may be used to balance cost and performance, but it will be appreciated that a resolution of 5000 ppi (corresponding to 5.08 μm pitch) or more can be achieved in silicon fingerprint sensors.

In some embodiments, a fingerprint sensor is implemented as a placement sensor (also "area" sensor or "static" sensor) or a swipe sensor (also "slide" sensor or "sweep" sensor). In a placement sensor implementation, the sensor is configured to capture a fingerprint input as the user's finger is held stationary over the sensing region. Typically, the placement sensor includes a two dimensional array of sensing elements capable of capturing a desired area of the fingerprint in a single frame. In a swipe sensor implementation, the sensor is configured to capture a fingerprint input based on relative movement between the user's finger and the sensing region. In some embodiments, the swipe sensor may include a linear array or a thin two-dimensional array of sensing elements configured to capture multiple frames as the user's finger is swiped or moves over the sensing region. The multiple frames may then be reconstructed to form an image of the fingerprint corresponding to the fingerprint input. In some implementations, the sensor is configured to capture both placement and swipe inputs.

In some embodiments, a fingerprint sensor is configured to capture less than a full area of a user's fingerprint in a single user input (referred to herein as a "partial" fingerprint sensor). Typically, the resulting partial area of the fingerprint captured by the partial fingerprint sensor is sufficient for the system to perform fingerprint matching from a single user input of the fingerprint (e.g., a single finger placement or a single finger swipe). Some exemplary imaging areas for partial placement sensors include an imaging area of 100 mm² or less. In another exemplary embodiment, a partial placement sensor has an imaging area in the range of 20-50 mm². In some implementations, the partial fingerprint sensor has an input surface that is of the same or substantially the same size as the imaging area.

In FIG. 1A, a processing system 110 is included with the input device 100. The processing system 110 may comprise parts of or all of one or more integrated circuits (ICs) and/or other circuitry components. The processing system 110 is coupled to the sensor 105, and is configured to operate hardware of the input device 100 (e.g., sensing hardware of the sensor 105) to detect input in the sensing region.

The processing system 110 may include driver circuitry configured to drive sensing signals with sensing hardware of the input device 100 and/or receiver circuitry configured to receive resulting signals with the sensing hardware. For example, processing system 100 may be configured to drive transmitter signals onto transmitter sensor electrodes of the sensor 105, and/or receive resulting signals detected via receiver sensor electrodes of the sensor 105.

The processing system 110 may include a non-transitory computer-readable medium having processor-executable instructions (such as firmware code, software code, and/or the like) stored thereon. The processing system 110 can be implemented as a physical part of the sensor 105, or can be physically separate from the sensor 105. Also, constituent components of the processing system 110 may be located together, or may be located physically separate from each other. For example, the input device 100 may be a peripheral device coupled to a computing device, and the processing system 110 may comprise software configured to run on a central processing unit of the computing device and one or more ICs (e.g., with associated firmware) separate from the central processing unit. As another example, the input device 100 may be physically integrated in a mobile device, and the processing system 110 may comprise circuits and firmware that are part of a main processor of the mobile device. The processing system 110 may be dedicated to implementing the input device 100, or may perform other functions, such as operating display screens, driving haptic actuators, etc.

The processing system 110 may operate the sensing element(s) of the sensor 105 of the input device 100 to produce electrical signals indicative of input (or lack of input) in a sensing region. The processing system 110 may perform any appropriate amount of processing on the electrical signals to translate or generate the information provided to the electronic system. For example, the processing system 110 may digitize analog electrical signals received via the sensor electrodes and/or perform filtering or conditioning on the received signals. In some embodiments, the processing system 110 may subtract or otherwise account for a baseline associated with the sensor electrodes. For example, the baseline may represent a state of the sensor electrode when no user input is detected. Accordingly, the information provided by the processing system 110 to the electronic system may reflect a difference between the signals received from the sensor electrodes and a baseline associated with each sensor electrode. As yet further examples, the processing system 110 may determine positional information, recognize inputs as commands, recognize handwriting, match biometric samples, and the like.

In some embodiments, the input device 100 may include a touch screen interface (e.g., display screen), as well as a fingerprint sensor, wherein a sensing region of the fingerprint sensor at least partially overlaps a sensing region of the touch screen interface. The display device may be any suitable type of dynamic display capable of displaying a visual interface to a user, including an inorganic light-emitting diode (LED) display, organic LED (OLED) display, cathode ray tube (CRT), liquid crystal display (LCD), plasma display, electroluminescence (EL) display, or other display technology. The display may be flexible or rigid, and may be flat, curved, or have other geometries. The display may include a glass or plastic substrate for thin-film transistor (TFT) circuitry, which may be used to address display pixels for providing visual information and/or providing other functionality. The display device may include a cover lens (sometimes referred to as a "cover glass") disposed above display circuitry and above inner layers of the display module, and the cover lens may also provide an input surface for the input device 100. Examples of cover lens materials include optically clear amorphous solids, such as chemically hardened glass, and optically clear crystalline structures, such as sapphire. The input device 100 and the display device may share physical elements. For example, some of the same electrical components may be utilized for both displaying visual information and for input sensing with the input device 100, such as using one or more display electrodes for both display updating and input sensing. As another example, the display screen may be operated in part or in total by the processing system 110 in communication with the input device 100.

FIG. 1B is a block diagram depicting the input device 100 as including a fingerprint sensor 105b. The fingerprint sensor 105b is configured to capture an image of the fingerprint from a finger 140. The fingerprint sensor 105b is disposed underneath a cover layer 112 that provides an input surface for the fingerprint to be placed on or swiped over the fingerprint sensor 105b. The sensing region 120 may include an input surface with an area larger than, smaller than, or similar in size to a full fingerprint. The fingerprint sensor 105b has an array of sensing elements with a resolution configured to detect surface variations of the finger 140. In certain embodiments, the fingerprint sensor 105b may be disposed within the active area of a display.

Figure 2A:
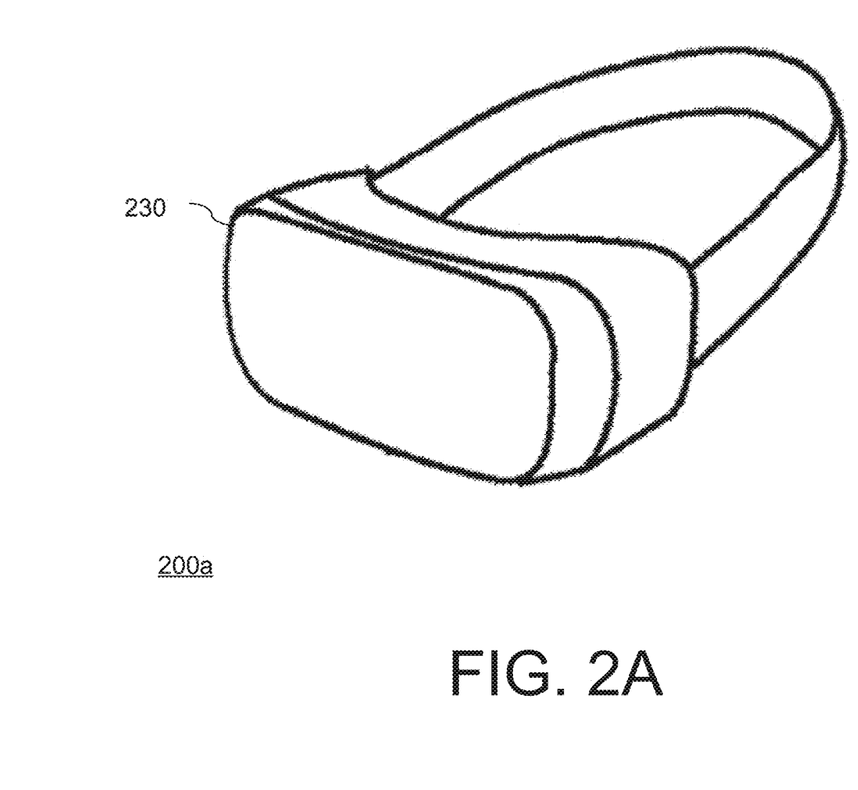
FIGS. 2A-2C are block diagrams depicting exemplary AR or VR environments.

FIG. 2A is a block diagram depicting an exemplary AR or VR environment 200a in which exemplary embodiments of the present disclosure may be utilized. The environment 200a includes, for example, an AR or VR headset 230 (e.g., in the form of goggles worn on a user's head which displays VR or AR information to the user). In this embodiment, the AR or VR headset 230 may be self-contained and have integrated processing capabilities for generating a display and receiving user input (e.g., through user interface elements integrated into the AR or VR headset 230, such as manual controls which can be actuated by a user or through sensor-based detection of user gestures).

In an exemplary embodiment, the AR or VR headset 230 may include a touch sensor and/or a fingerprint sensor, each having a respective processing system as discussed above with respect to FIGS. 1A-1B implemented in the AR or VR headset 230. A combined processing system which controls both a touch sensor and a fingerprint sensor may also be utilized.

Figure 2B:
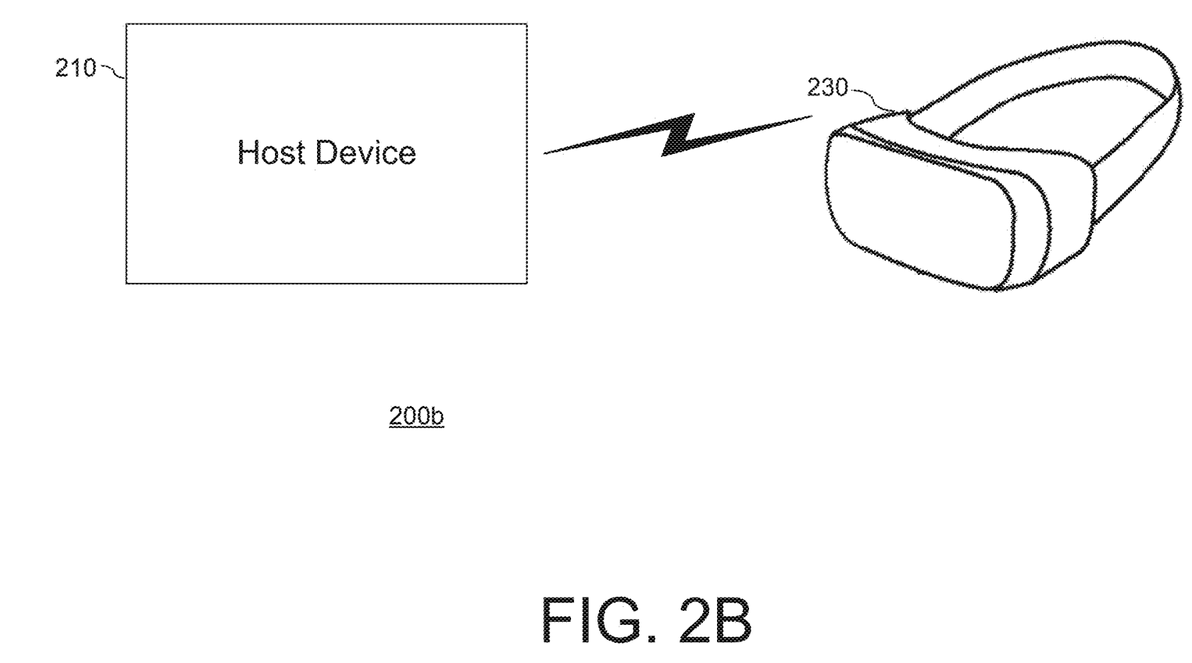

FIG. 2B is a block diagram depicting another exemplary AR or VR environment 200b in which exemplary embodiments of the present disclosure may be utilized. The environment 200b includes, for example, a host device 210 in addition to an AR or VR headset 230 (e.g., in the form of goggles worn on a user's head which displays VR or AR information to the user). In this embodiment, the AR or VR headset 230 may communicate with the host device and carry out various processing operations with the assistance of the host device 210—for example, relating to generating a display for the user and processing received user inputs (e.g., received through user interface elements integrated into the AR or VR headset 230, such as manual controls which can be actuated by a user or through sensor-based detection of user gestures). The host device 210 may be, for example, a computing device such as a personal computer (PC), laptop, tablet, smartphone, gaming console, server, or another type of device which is able to communicate with the AR or VR headset 230 and execute processing tasks in connection therewith.

In an exemplary embodiment, the AR or VR headset 230 may include a touch sensor and/or a fingerprint sensor, each having a respective processing system as discussed above with respect to FIGS. 1A-1B. A combined processing system which controls both a touch sensor and a fingerprint sensor may also be utilized. The processing system(s) may be implemented within the AR or VR headset 230 and may be in communication with the host device 210. Alternatively, the processing system(s) may be implemented within the host device 210.

Figure 2C:
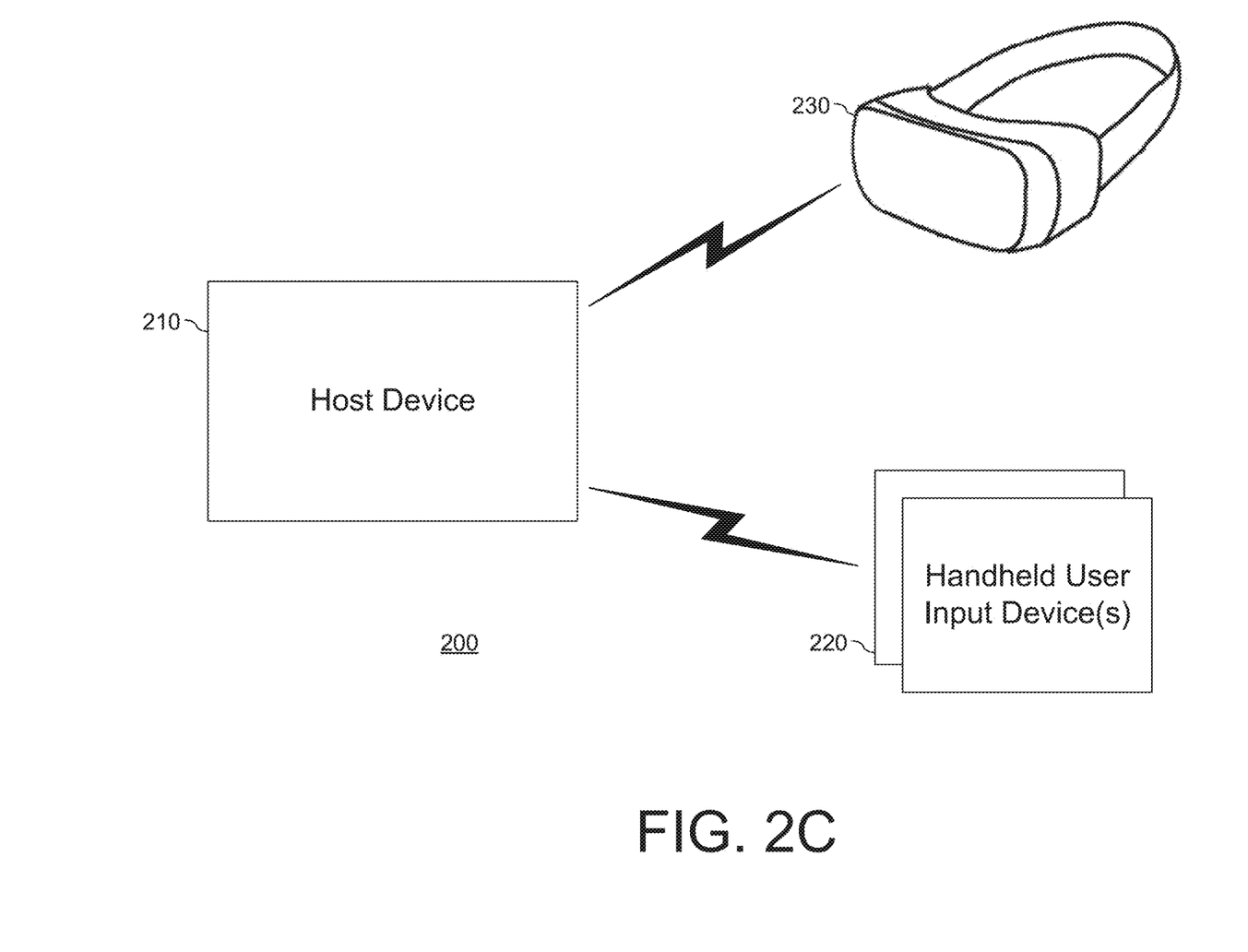

FIG. 2C is a block diagram depicting yet another exemplary AR or VR environment 200c in which exemplary embodiments of the present disclosure may be utilized. The environment 200c includes, for example, a host device 210, one or more handheld user input device(s) 220, and an AR or VR headset 230 (e.g., in the form of goggles worn on a user's head which displays VR or AR information to the user). The handheld user input device(s) 220 may include a single user input device to be held by the user in one hand or two user input devices to be held by the user in both hands. The handheld user input device(s) 220 may be in the form of, for example, remote control devices, gaming controllers, or any other shape suitable for being held by a user's hand, and may include buttons or other inputs (such as touch-sensitive surfaces) disposed in various positions thereon. The host device 210 may be, for example, a computing device such as a personal computer (PC), laptop, tablet, smartphone, gaming console, server, or another type of device which is able to communicate with the display device 230 and the handheld user input device(s) 220 and execute processing tasks in connection therewith.

In exemplary embodiments, one or both of the handheld user input device(s) 220 may include a touch sensor and/or a fingerprint sensor, each having a respective processing system as discussed above with respect to FIGS. 1A-1B. A combined processing system which controls both a touch sensor and a fingerprint sensor may also be utilized. The processing system(s) may be implemented within the handheld user input device(s) 220 and may be in communication with the host device 210. Alternatively, the processing system(s) may be implemented within the host device 210 or in the AR or VR headset 230.

It will be appreciated that the environments 200a-c depicted in FIGS. 2A-2C are merely examples, and that exemplary embodiments of the present disclosure may also be implemented in other environments. For example, exemplary embodiments of the present disclosure may also be implemented in connection with a non-VR and non-AR system in which a handheld user input device is used in connection with a non-touch display screen, and the non-touch display screen may be implemented in the handheld user input device and/or on a separate display device. To provide yet another example, the handheld user input device may be replaced with a user input device which is not necessarily handheld.

Figure 3:
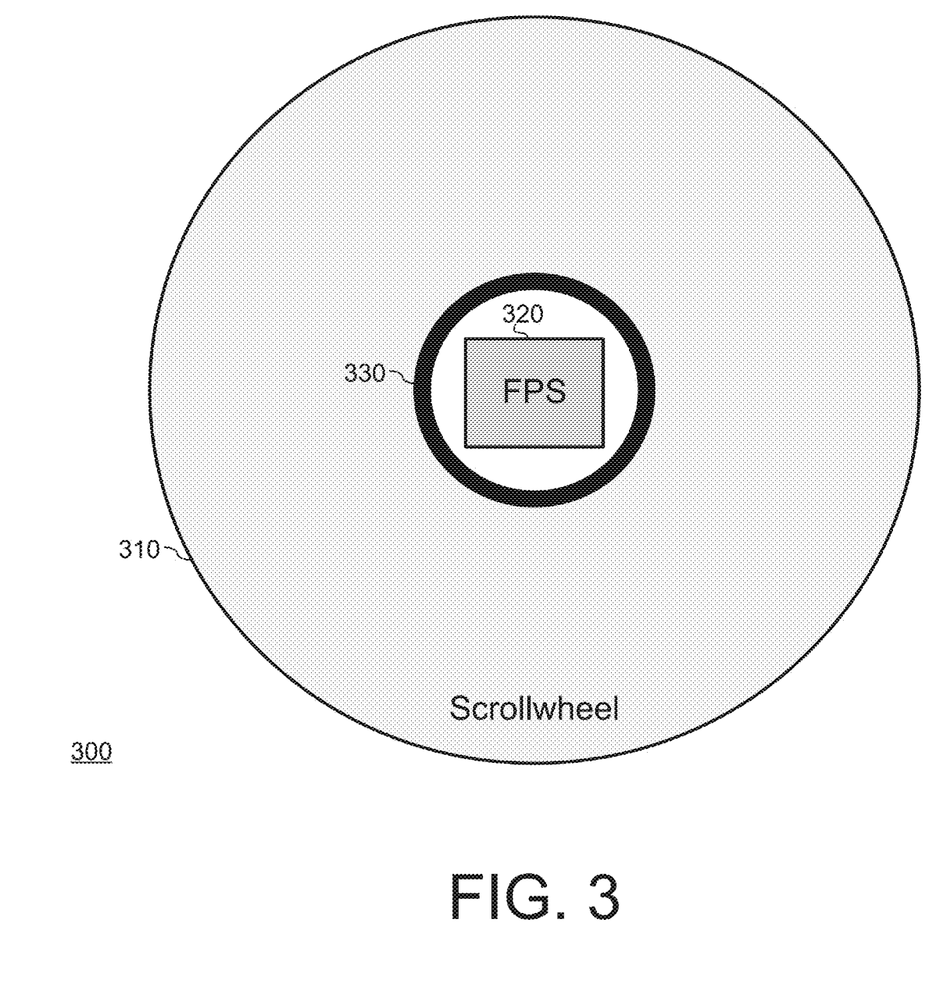
FIG. 3 is a schematic diagram illustrating an integrated scrollwheel and FPS user input apparatus in an exemplary embodiment.

FIG. 3 is a schematic diagram illustrating an integrated scrollwheel and FPS user input apparatus 300 in an exemplary embodiment. The integrated scrollwheel and FPS user input apparatus 300 includes a scrollwheel 310, a fingerprint sensor (FPS) 320, and optionally a tactile ridge 330, and may be integrated in the AR or VR headset 230 shown in FIGS. 2A-2C (e.g., based on being embedded into a side of the headset) and/or in the handheld user input device(s) shown in FIG. 2C. It will be appreciated that the AR or VR headset 230 and/or the handheld user input device(s) 220 may also include other buttons or input elements apart from what is depicted in FIG. 3.

The scrollwheel 310 may be, for example, a capacitive touch sensor, an optical touch sensor, or a mechanical sensor. The scrollwheel 310 is configured to detect a user's finger (e.g., the user's thumb) being in proximity with or in contact with the scrollwheel 310 and, based on input from the scrollwheel 310, a corresponding processing system may be able to resolve one-dimensional (1D) motion with respect to whether the user's finger moves in a clockwise or counterclockwise direction around the scrollwheel (e.g., to provide up/down or left/right scrolling navigation in connection with a display), as well as the speed at which the user's finger is moving (e.g., to provide relatively slower or faster scrolling navigation in connection with the display). In certain exemplary embodiments, the scrollwheel 310 may also be configured to detect two-dimensional (2D) motion such that, based on detected input from the scrollwheel 310, a corresponding processing system may be able to distinguish between clockwise/counterclockwise motions and other types of motions.

In the exemplary embodiment depicted in FIG. 3, the scrollwheel 310 is shaped as a wheel (i.e., two concentric circles establishing an outer boundary and an inner boundary), but in other embodiments, the scrollwheel 310 may have a different shape. For example, in some alternative embodiments, the scrollwheel 310 may have a non-circular shape or may be replaced with a rectangular scrollbar.

The FPS 320 may be, for example, a capacitive FPS, an optical FPS, or an ultrasonic FPS. The FPS 320 is configured to detect features of a user's fingerprint such that a corresponding processing system may authenticate a user based on the detected input from the FPS 320. The FPS 320 may also be force-sensitive such that the FPS 320 is configured to detect an amount of force with which a user's finger is pressing on the FPS 320, and the corresponding processing system may register a button press action based on the amount of force being above a certain threshold. Alternatively, the FPS 320 may be integrated with a button, with the processing system registering a button press action based on the button being depressed. In yet another alternative embodiment, a processing system may register a button press action based on detecting the presence of a user's finger on the FPS 320.

A tactile ridge 330 is optionally disposed between the FPS 320 and the scrollwheel 310 such that a user is able to feel the inner boundary of the scrollwheel with the user's finger. The tactile ridge 330 may help to guide the user during a scrolling motion and avoid unintentionally touching the FPS 320 while trying to scroll. The tactile ridge 330 may also help the user to locate the FPS 320 when the user needs to perform an authentication operation and/or a button press using the FPS 320. The tactile ridge 330 may be, for example, a relatively thin raised portion of a surface of the handheld user input device disposed between the sensing region of the FPS 320 and the sensing region of the scrollwheel. The tactile ride 330 may also include, for example, a textured pattern.

In certain exemplary embodiments, the FPS 320 and the scrollwheel 310 may have separate respective controllers or may have an integrated controller which controls both the FPS 320 and the scrollwheel 310. In an exemplary embodiment, the scrollwheel 310 may be implemented as one sensor having a built-in processor or application-specific integrated circuit (ASIC), and the FPS 320 may be implemented as another sensor having another built-in processor or ASIC, whereby both processors/ASICs communicate separately with an AR or VR headset and/or a host device. In another exemplary embodiment, the scrollwheel 310 and the FPS 320 having separate respective processors/ASICs may be logically combined into a single input device which communicates through only one of the two processors/ASICs.

Regardless of the specific configuration of the processor/ASIC structure of the scrollwheel 310 and the FPS 320, as discussed above, the scrollwheel 310 and FPS 320 may both be considered as being part of an integrated scrollwheel and FPS user input apparatus 300, and the integrated scrollwheel and FPS user input apparatus 300 may be embedded into an AR or VR headset. In an exemplary embodiment, the integrated scrollwheel and FPS user input apparatus 300 reports to a processor of the AR or VR headset, and the AR or VR headset may in turn report to a host device or be self-contained.

In an exemplary embodiment, the integrated scrollwheel and FPS user input apparatus 300 depicted in FIG. 3 may be implemented as part of a larger touchpad device such that the scrollwheel 310 and the FPS 320 are both parts of the larger touchpad device.

Figure 4A:
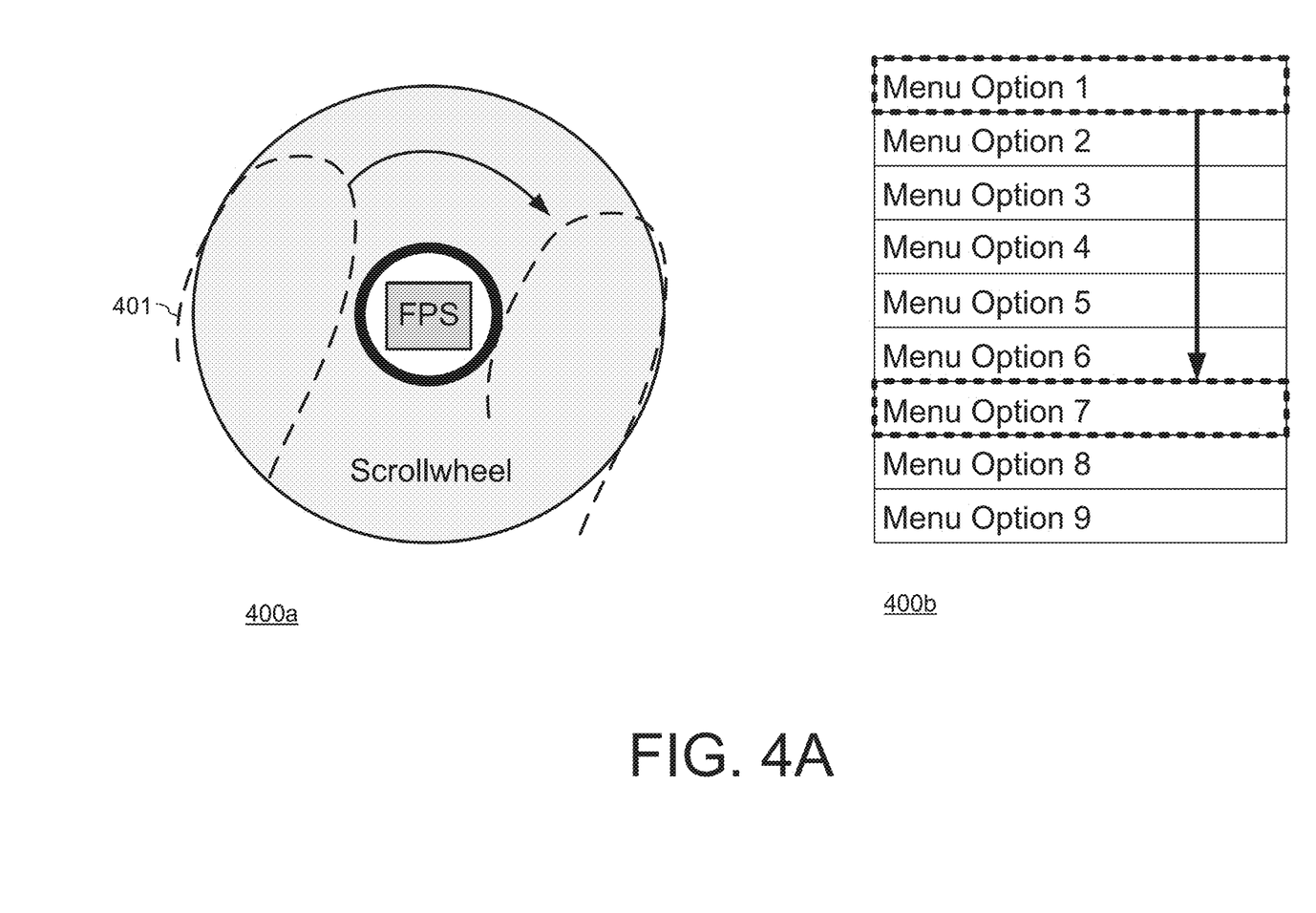
FIGS. 4A-4B depict exemplary manners of utilizing the integrated scrollwheel and FPS user input apparatus depicted in FIG. 3.
Figure 4B:
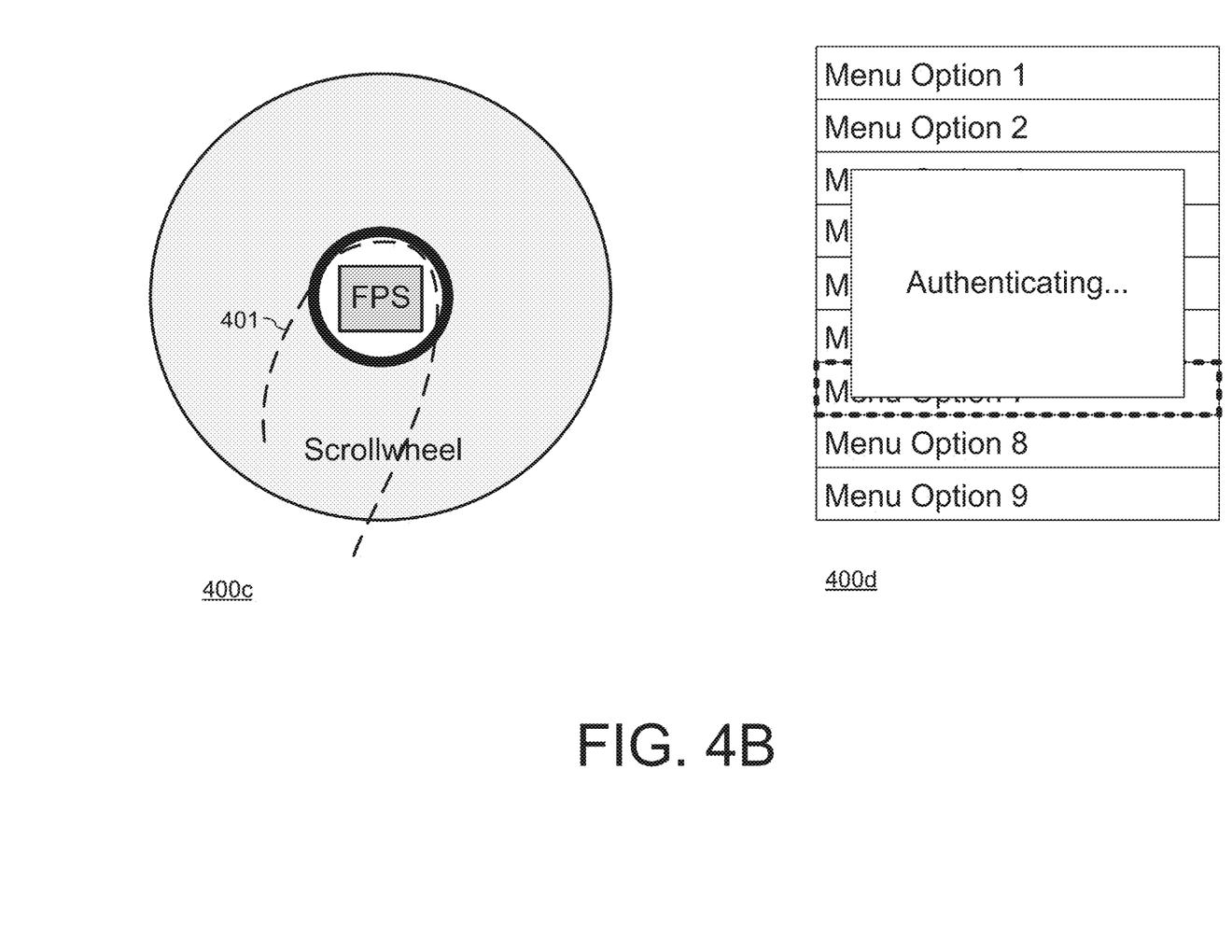

FIGS. 4A-4B depict exemplary manners of utilizing the integrated scrollwheel and FPS user input apparatus depicted in FIG. 3. The left side 400*a* of FIG. 4A depicts an exemplary clockwise motion performed by a user's thumb 401 on the scrollwheel, and the right side 400*b* of FIG. 4A depicts an exemplary corresponding menu that is displayed to the user through a display device. For example, based on the scrollwheel detecting the clockwise motion shown on the left side 400*a*, the host device recognizes the clockwise motion as being a downward menu navigation command, and the host device adjusts a user interface displayed to the user accordingly as shown on the right side 400*b* of FIG. 4A—i.e., by moving a current menu selection downwards by an amount based on the distance and/or the speed of the clockwise motion. In this example, the user has scrolled down from "Menu Option 1" to "Menu Option 7" based on the clockwise movement of the user's thumb on the scrollwheel, and the user could similarly navigate back to "Menu Option 1" to "Menu Option 7" with a similar counterclockwise movement of the user's thumb on the scrollwheel.

With "Menu Option 7" as the current menu selection, the user may then provide an activation or confirmation input with respect to "Menu Option 7," for example, by placing the user's finger over the FPS, by pressing down on the FPS, by pressing down on a button integrated with the FPS, or by pressing some other button on a user input device or a headset. And in case "Menu Option 7" corresponds to an operation which utilizes biometric authentication (e.g., in case executing the functionality associated with "Menu Option 7" corresponds to a financial transaction, an action requiring the user to log-in, or some other action for which enhanced security may be beneficial), the user may then hold his or her thumb over the FPS as shown in the left side 400*c* of FIG. 4B. As the user is being authenticated via the FPS, the menu interface shown in the right side 400*d* may include a pop-up notification which shows that the authentication is occurring. Then, based on the authentication being successful, the operation associated with "Menu Option 7" may be executed (e.g., an in-app or in-game purchase may be completed, the user may be logged-in to access certain protected functionality, etc.).

It can thus be seen from FIGS. 4A-4B that exemplary embodiments of the present disclosure provide an integrated scrollwheel and FPS user input apparatus which improves user experience, especially in AR or VR systems, by providing seamless authentication together with navigation. Based on the scrollwheel and FPS sensing regions being proximate to one another (e.g. with the scrollwheel surrounding the FPS as shown in FIG. 3), the user is able to quickly and intuitively transition from menu navigation to authentication and back to menu navigation without needing to look at the user input apparatus. The tactile ridge on the inner boundary of the scrollwheel further helps to guide the user and helps the user to easily locate the FPS.

It will be appreciated that the menu interfaces shown in parts 400*b* and 400*d* of FIGS. 4A-4B are merely exemplary, and that various other types of interfaces may also utilize the integrated scrollwheel and FPS user input apparatus shown in FIG. 3. For example, the integrated scrollwheel and FPS user input apparatus may also be used to navigate between a plurality of icons (corresponding to respective applications) arranged in a line or in a grid, as well as for authenticating a user in connection with logging to a respective application selected by the user.

Figure 5:
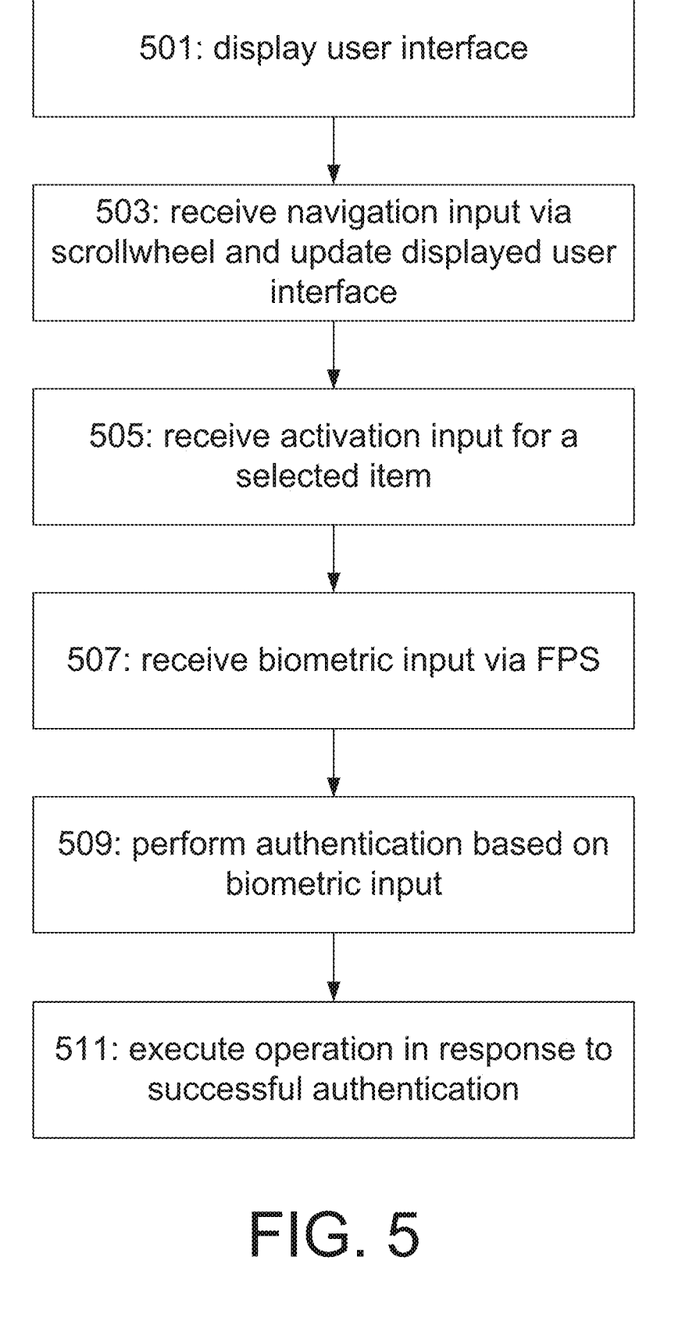
FIG. 5 is a flowchart depicting an exemplary process for utilizing an integrated scrollwheel and FPS user input apparatus in accordance with an exemplary embodiment.

FIG. 5 is a flowchart depicting an exemplary process for utilizing an integrated scrollwheel and FPS user input apparatus in accordance with an exemplary embodiment.

At stage 501, a user interface is displayed to a user. For example, in the environment of FIG. 2, a host device may generate display information to be displayed on a VR or AR display device, or in other exemplary environments, a host device may generate display information to be displayed on other types of displays, such as a conventional non-touch display screen. The user interface displayed to the user may include a plurality of selectable items.

At stage 503, navigation input is received from a user via an integrated scrollwheel and FPS user input apparatus, for example, via the scrollwheel depicted in FIG. 3. The scrollwheel may detect a movement of a user's finger (such as the user's thumb) in a certain manner (such as in a clockwise or counterclockwise rotational manner). Based on the movement detected via the scrollwheel, the host device may update the display in a manner corresponding to the detected movement, for example, by adjusting a current selection in the displayed user interface (e.g., adjusting a current menu selection as shown in FIG. 4A). Other adjustments based on the movement detected via the scrollwheel may include for example, adjustment of a volume control or other system setting, adjustment of a current view, or other adjustments which may intuitively correspond to a clockwise or counterclockwise rotational movement of a user's finger.

It will be appreciated that, as discussed above, the host device may be separate from a display device and a user input device (e.g., as shown in FIG. 2C), or the host device may be integrated with the display device and may include a user input apparatus (e.g., as shown in FIG. 2A). For example, in one exemplary implementation, the device comprising the display may also comprise a processor for generating the display information, and thereby fulfills the roles of both the host device and the display device. In another exemplary implementation, a single device may fulfill the roles of the host device, the display device, and the user input device(s) as shown in FIG. 2A.

At stage 505, an activation input is received for a currently selected item in the displayed user interface. For example, the activation input may be the user pressing down on a button on a user input device, such as a button integrated with the FPS of an integrated scrollwheel and FPS user input apparatus, a button separately disposed on another part of the user input device, or a button separately disposed on another user input device. In another example, the activation input may be the user pressing down on the FPS of an integrated scrollwheel and FPS user input apparatus, wherein the FPS is configured to detect an amount of pressing force and a corresponding processing system is configured to detect the activation input based on the amount of pressing force being greater than a threshold. In yet another example, the activation input may be the detection of the presence of the user's finger on the FPS of an integrated scrollwheel and FPS user input apparatus.

In certain embodiments, such as when the activation input is based on detection of the presence of the user's finger, the system may distinguish between a slide-over motion from the scrollwheel to the FPS (which might correspond to an inadvertent touching of the FPS) versus of a lift-up motion off the scrollwheel followed by a place-down motion onto the FPS (which is more likely to correspond to a deliberate touching of the FPS). In case a lift-up motion off the scrollwheel is followed by a place-down motion on to the FPS, the processing system may register the activation input immediately upon detecting the placement of the finger onto the FPS. In case a slide-over motion from the scrollwheel to the FPS is detected, additional measures may be employed before registering the activation input—for example, the processing system may wait until the user's finger has remained on (or remained stationary on) the FPS for at least a predetermined amount of time before registering the activation input, or the processing system may require an additional lift-and-place motion on the FPS (i.e., lift-up from the FPS and place-down on the FPS) before registering the activation input (in which case a corresponding prompt may be displayed to the user to instruct the user to perform the lift-and-place motion on the FPS to provide the activation input).

In an exemplary embodiment, to detect the slide-over motion, the scrollwheel may be configured as a 2D sensor capable of not only detecting clockwise and counterclockwise motions on the scrollwheel, but also capable of detecting a diagonal sliding motion towards the center of the scrollwheel. In yet another exemplary embodiment, to detect the slide-over motion, the scrollwheel and FPS may share a processing system configured for controlling both the scrollwheel and FPS such that a transition from the scrollwheel and FPS is detectable by the shared processing system. In yet another exemplary embodiment, to detect the slide-over motion, the tactile ridge of the integrated scrollwheel and FPS user input apparatus may further be configured with one or more sensing electrodes such that a slide-over motion may be detected based on, for example, detecting a transition of the finger from being disposed on the scrollwheel to being disposed on the FPS in a manner where the finger passes through a state where the finger is simultaneously in contact with the scrollwheel, the FPS, and the tactile ridge.

In certain exemplary embodiments, the reception of an activation input at stage 505 corresponds to selection of a menu item. In certain situations, such as when navigating from a menu to a sub-menu and opening up the sub-menu based on selection of a menu item in the base menu, this may result in execution of an operation that does not require biometric authentication such that stages 507-511 would not be needed. In other situations, such as when the activation of the selected menu item results in a financial transaction or a log-in operation or some other operation benefitting from authentication, stages 507-511 are performed.

At stage 507, a biometric input is received via the FPS of the integrated scrollwheel and FPS user input apparatus. In certain exemplary implementations, the scanning of the sensing region of the FPS at stage 507 is performed in combination with receiving the activation input. For example, once the user presses down on a button integrated with the FPS or places a finger on the FPS for activation, the FPS scanning is automatically triggered and begins such that stages 505 and 507 can be thought of as being carried out together. In other exemplary implementations, the scanning of the sensing region is implemented as a separate step whereby the user is required to first touch or press the FPS to provide the activation input, and then prompted to lift and place the finger again for authentication.

At stage 509, a processing system associated with the FPS of the integrated scrollwheel and FPS user input apparatus uses the received biometric input (i.e., the user's fingerprint) to perform authentication, for example, by comparing the received biometric input to stored templates corresponding to one or more pre-enrolled authorized users. It will be appreciated that the part of the processing system which performs authorization may be implemented in the integrated scrollwheel and FPS user input apparatus or in a host device in communication with the integrated scrollwheel and FPS user input apparatus or in a display device or AR or VR headset in communication with the integrated scrollwheel and FPS user input apparatus.

At stage 511, the processing system (which may include a host device separate from the integrated scrollwheel and FPS user input apparatus) executes an operation in response to successful authentication. For example, the processing system may carry out a financial transaction, perform a log-in operation, or perform some other operation after the user is authenticated. In case the authentication fails, the processing system may block the operation that was requested by the user, and may further request that the user make another authentication attempt.

In certain situations, it may be advantageous to provide for continuous or periodic authentication of a user who is logged-in to a system or an application. For example, if the user is playing a game, to avoid cheating, the system or the game application may wish to continuously or periodically verify that the logged-in user is the user who is actually playing (as opposed to one user logging in and then having some other user play for the logged-in user). Similarly, if the user is using a sensitive network application or system, to prevent fraud and/or security breaches, the network application or system may wish to continuously or periodically verify that the logged-in user is still the user which is using the network application or system. In these continuous or periodic authentication scenarios, a user of an integrated scrollwheel and FPS user input apparatus in accordance with exemplary embodiments of the disclosure may be instructed (e.g., via a display or an instruction manual) to rest the user's finger on the FPS of the integrated scrollwheel and FPS user input apparatus while the scrollwheel is not in use. The FPS of the integrated scrollwheel and FPS user input apparatus may then perform continuous or periodic scans of the user's fingerprint to provide for continuous or periodic authentication.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A virtual reality (VR) or augmented reality (AR) system, comprising:
    a display configured to display a user interface to a user of the VR or AR system;
    an integrated scrollwheel and fingerprint sensor (FPS) user input apparatus, comprising a scrollwheel configured to detect a rotational navigation input from the user and an FPS configured to detect a biometric input from the user; and
    a processing system configured to:
        receive the rotational navigation input via the scrollwheel of the integrated scrollwheel and FPS user input apparatus;
        update a displayed user interface on the display based on the received rotational navigation input, wherein updating the displayed user interface comprises updating a user selection on a displayed menu;
        receive an activation input for the updated user selection on the displayed menu via the FPS of the integrated scrollwheel and FPS user input apparatus, wherein the activation input is a detected biometric input;
        perform authentication based on the detected biometric input; and
        execute an operation corresponding to the updated user selection on the displayed menu in response to successful authentication;
    wherein the processing system is further configured to:
        receive another activation input for another user selection on the displayed menu via the FPS of the integrated scrollwheel and FPS user input apparatus; and
        execute another operation corresponding to the another user selection on the displayed menu in response to the another activation input without performing authorization for the another operation.

2. The VR or AR system according to claim 1, wherein performing authentication based on the detected biometric input comprises determining whether the detected biometric input matches a stored template of a pre-enrolled authorized user.

3. The VR or AR system according to claim 1, wherein the integrated scrollwheel and FPS user input apparatus and the display are both physically integrated into a same housing.

4. The VR or AR system according to claim 1, wherein the integrated scrollwheel and FPS user input apparatus and the display are both physically integrated into a housing of a VR or AR headset.

5. The VR or AR system according to claim 1, wherein the integrated scrollwheel and FPS user input apparatus and the display are physically integrated into separate housings of separate devices.

6. A method for navigation, comprising:
    displaying, by a display, a user interface to a user;
    receiving, by a processing system, via a scrollwheel of an integrated scrollwheel and fingerprint sensor (FPS) user input apparatus, a rotational navigation input;
    updating, on the display, the displayed user interface based on the received rotational navigation input, wherein updating the displayed user interface comprises updating a user selection on a displayed menu;
    receiving, by the processing system, an activation input for the updated user selection on the displayed menu, wherein the activation input is a biometric input detected via an FPS of the integrated scrollwheel and FPS user input apparatus;
    performing, by the processing system, authentication based on the detected biometric input; and
    executing, by the processing system, an operation corresponding to the updated user selection on the displayed menu in response to successful authentication;
    wherein the method further comprises:
        receiving, by the processing system, another activation input for another user selection on the displayed menu via the FPS of the integrated scrollwheel and FPS user input apparatus; and
        executing, by the processing system, another operation corresponding to the another user selection on the displayed menu in response to the another activation input without performing authorization for the another operation.

7. The method according to claim 6, wherein performing authentication based on the detected biometric input comprises determining whether the detected biometric input matches a stored template of a pre-enrolled authorized user.

8. The method according to claim 6, wherein the integrated scrollwheel and FPS user input apparatus and the display are both physically integrated into a same housing.

9. The method according to claim 6, wherein the integrated scrollwheel and FPS user input apparatus and the display are both physically integrated into a housing of a VR or AR headset.

10. The method according to claim 6, wherein the integrated scrollwheel and FPS user input apparatus and the display are physically integrated into separate housings of separate devices.

11. One or more non-transitory computer-readable mediums having processor-executable instructions stored thereon for navigation, wherein the processor-executable instructions, when executed, facilitate:
    displaying, by a display, a user interface to a user;
    receiving, by a processing system, via a scrollwheel of an integrated scrollwheel and fingerprint sensor (FPS) user input apparatus, a rotational navigation input;
    updating, on the display, the displayed user interface based on the received rotational navigation input, wherein updating the displayed user interface comprises updating a user selection on a displayed menu;
    receiving, by the processing system, an activation input for the updated user selection on the displayed menu, wherein the activation input is a biometric input detected via an FPS of the integrated scrollwheel and FPS user input apparatus;

performing, by the processing system, authentication based on the detected biometric input; and executing, by the processing system, an operation corresponding to the updated user selection on the displayed menu in response to successful authentication;

wherein the processor-executable instructions, when executed, further facilitate:

receiving, by the processing system, another activation input for another user selection on the displayed menu via the FPS of the integrated scrollwheel and FPS user input apparatus; and executing, by the processing system, another operation corresponding to the another user selection on the displayed menu in response to the another activation input without performing authorization for the another operation.

12. The one or more non-transitory computer-readable mediums according to claim 11, wherein performing authentication based on the detected biometric input comprises determining whether the detected biometric input matches a stored template of a pre-enrolled authorized user.

13. The one or more non-transitory computer-readable mediums according to claim 11, wherein the integrated scrollwheel and FPS user input apparatus and the display are both physically integrated into a same housing.

14. The one or more non-transitory computer-readable mediums according to claim 11, wherein the integrated scrollwheel and FPS user input apparatus and the display are both physically integrated into a housing of a VR or AR headset.

15. The one or more non-transitory computer-readable mediums according to claim 11, wherein the integrated scrollwheel and FPS user input apparatus and the display are physically integrated into separate housings of separate devices.

* * * * *